Oct. 4, 1966 S. SARETZKY 3,276,675
ELECTRICALLY DRIVEN FAN HAVING SELF-CONTAINED LUBRICATION MEANS
Filed Dec. 10, 1964
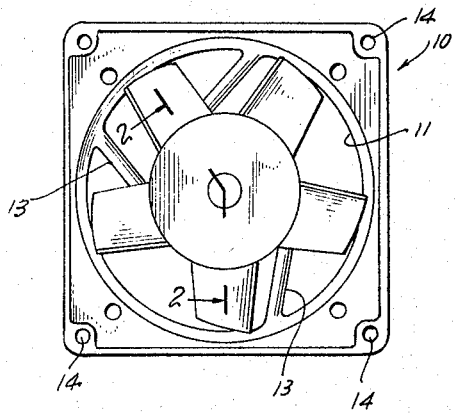
FIG. 1
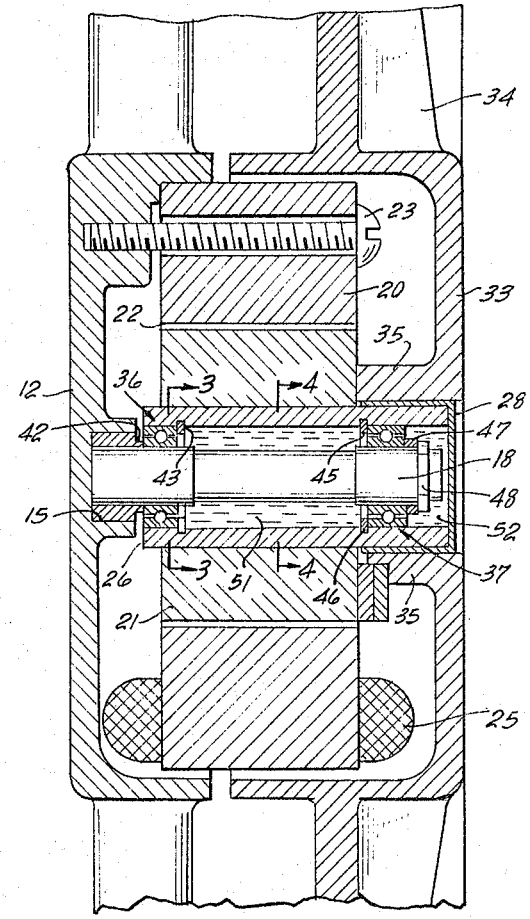
FIG. 2
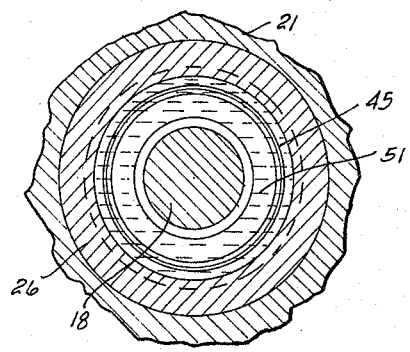
FIG. 3
FIG. 4
INVENTOR:
SIMON SARETZKY
BY
ATTORNEYS 3,276,675
ELECTRICALLY DRIVEN FAN HAVING SELF-
CONTAINED LUBRICATION MEANS
Simon Saretzky, Port Washington, N.Y., assignor to
IMC Magnetics Corp., Westbury, N.Y., a corporation
of New York
Filed Dec. 10, 1964, Ser. No. 417,354
1 Claim. (Cl. 230—117)

This invention relates to electrically driven fans, and more particularly to such a fan employing ball bearings for rotatably supporting the fan impeller with respect to a mounting frame.

An electric motor must, of course, be provided for rotating the fan impeller. I prefer to use an induction motor having an outer annular stator fixed to the fan frame, and an annular rotor rotatable within the stator. A sleeve fixed within the rotor surrounds a stationary shaft carried by the frame.

It is an object of the present invention to rotatably support the rotor-carrying sleeve on the stationary shaft by means of a unique arrangement of ball bearings between the sleeve and shaft.

It is another object of the invention to provide an arrangement whereby the sleeve, ball bearings, and shaft may be quickly and easily assembled.

It is a very important object of the invention to provide a ball bearing mounting between the sleeve and shaft which is continuously lubricated from a self-contained grease reservoir.

To achieve these objects, the invention provides a pair of ball bearings, each of which has its inner race fixed to the shaft and its outer race fixed to and rotatable with the sleeve. The inner surface of the sleeve is provided with a channel adjacent to each bearing for accommodating a snap ring which prevents movement of the sleeve longitudinally with respect to the shaft. The bearings are spaced apart along the length of the shaft, and the annular space between them, defined by the shaft and sleeve, serves as a grease reservoir which is filled with grease when the parts are assembled. Furthermore, the end of the sleeve adjacent to the free end of the shaft is closed to define together with the free end of the shaft and the bearing closer to the free end a second grease reservoir. Lubricant is therefore continuously fed to the bearings.

Other objects and advantages of the invention will be apparent from the following description in which reference is made to the accompanying drawings.

In the drawings:
FIG. 1 is a front elevational view of a fan of the type to which this invention relates;
FIG. 2 is a fragmentary vertical cross-sectional view, on an enlarged scale, taken on line 2—2 of FIG. 1;
FIG. 3 is a vertical cross-sectional view taken on line 3—3 of FIG. 2; and
FIG. 4 is vertical cross-sectional view taken on line 4—4 of FIG. 2.

The fan chosen to illustrate this invention includes a frame 10 comprising a square outer portion provided with a central circular opening 11, and a motor support 12 held at the center of the opening 11 by a number of struts 13 extending between the support 12 and the outer portion of the frame. If desired, the entire frame can be formed as a single casting. At its corners, the frame 10 is provided with holes 14 for accommodating suitable fasteners (not shown). By means of these fasteners, the frame can be mounted in or near a region in which air is to be circulated.

The motor support 12 is a circular, cup-like element having a central bore 15. One end of a stationary cylindrical shaft 18 is fixed in the bore 15, by any suitable means such as a cement, and the balance of the shaft 18 projects from the support 12 in cantilever fashion. The shaft, in effect, serves as an extension of the frame 10 upon which the impeller of the fan is rotatably supported.

The impeller is rotated by an induction motor comprising a stator 20 and a rotor 21. The stator 20 is a generally annular shaped body having a central bore 22, and is fixed within the motor support 12 by suitable fastening means, such as the screws 23. The stator is provided with the usual field windings 25 which may be energized from any suitable source of electrical current. The rotor 21 is an annular body located within the bore 22 of the stator, but unconnected to the stator. Fixed to the inner surface of the rotor is an axially-extending sleeve 26 formed of stainless steel or other similar material, which rotates with the rotor 21. The end of the sleeve 26 adjacent to the free end of the shaft 18 is closed by a cap 28 cemented to the outer surface of the sleeve.

The impeller of the fan comprises a generally cup-shaped hub 33 formed with radially projecting blades 34. At the center of its front wall, the hub presents an inwardly projecting collar 35 adapted to fit snugly over the cap 28. The collar is secured to the cap by any suitable means, such as cement. Preferably the hub 33, blades 34, and collar 35 are integrally formed of, for example, a suitable molded plastic. When the impeller is in place, as shown in FIG. 2, the side walls of the hub 33 terminate close to the side walls of the motor support 12, whereby the hub and motor support form a housing for the induction motor.

Between the sleeve 26 and shaft 18 are a pair of ball bearings 36 and 37. The inner race 38 of each bearing is fixed to the shaft 18, and therefore remains stationary, and the outer race 39 of each bearing is fixed to the inner surface of the sleeve 26, and therefore rotates with the sleeve. The inner stationary race 38 of the bearing 36 abuts a boss 42, formed on the motor support 12, surrounding the bore 15. The bearing 36 is maintained in this position by a snap ring 43 which abuts the opposite side of the outer race 39. The snap ring seats in an annular channel 44 formed in the inner surface of the sleeve 26 adjacent to the bearing 36. By virtue of the arrangement just described, there is no relative movement between the bearing 36 and the boss 42, or between the bearing 36 and the snap ring 43.

The outer race of the bearing 37 abuts against a snap ring 45 seated in a channel 46 formed in the sleeve 26 adjacent to the bearing. The bearing 37 is maintained in this position by means of a series of washers 47 and a lock nut 48 secured to the shaft 18 near its free end.

It will be noted that between the bearings 36 and 37, an annular space is defined by the outer surface of the shaft 18 and the inner surface of the sleeve 26. This annular space is employed as a reservoir for a suitable lubricant, such as grease 51. Since the inner diameter of the snap rings 43 and 45 is larger than the outer diameter of the shaft 18, the grease 51 is in direct contact with the bearings 36 and 37. Consequently, the grease is continuously fed to the bearings. This action may be enhanced, if desired, by introducing the grease into the annular reservoir under a slight pressure. The diameter of the shaft 18 is reduced in the region between the snap rings 43 and 45 in order to increase the spacing between the shaft and the sleeve 26 and thereby increase the capacity of the grease reservoir.

The enclosed space defined by the cap 28, the end of the sleeve 26 adjacent to the free end of the shaft 18, the bearing 37, and the free end of the shaft, may also be filled with grease 52 and thereby serve as a supplemental grease reservoir for supplying the bearing 37 with lubricant. It will be appreciated from the above description that the present invention provides a ball bearing mounting for the impeller of an electrically driven fan having self-contained lubrication means. Consequently, the fan is adapted to run almost indefinitely without additional lubrication.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claim.

What is claimed is:

An electrically driven fan comprising a frame, an induction motor having a stator fixed to said frame and an annular shaped rotor rotatable with respect to said stator and frame, a stationary shaft fixed at one end to said frame and projecting in cantilever fashion therefrom, a sleeve fixed within said rotor and rotatable therewith, said sleeve surrounding said shaft, a fan impeller fixed to the end of said sleeve adjacent to the free end of said shaft, a pair of ball bearings between said sleeve and said shaft, the inner races of said bearings being fixed to said stationary shaft, and the outer races being fixed to said sleeve and rotatable therewith, said bearings being spaced apart along the length of said shaft, and said sleeve being provided on its inner surface with a channel adjacent to the side of each of said bearings facing the other, and a resilient snap ring in each of said channels serving as an abutment for its respective bearing, said rings engaging only the outer races of their respective bearings, whereby said sleeve is prevented from moving longitudinally with respect to said shaft due to the reaction force of moving air on the impeller when the latter rotates, and whereby when electric current is supplied to said motor said rotor and hence said sleeve and impeller will rotate with respect to said frame.

References Cited by the Examiner
UNITED STATES PATENTS

| | | |
|---|---|---|
| 2,280,886 | 4/1942 | Brace. |
| 2,596,783 | 5/1952 | Moore _____ 230—117 X |
| 2,990,112 | 6/1961 | Levy et al. _____ 230—259 |
| 3,158,412 | 11/1964 | Willhoeft et al. |

ROBERT M. WALKER, *Primary Examiner.*